(12) United States Patent
Leister (10) Patent No.: US 8,928,825 B2
(45) Date of Patent: Jan. 6, 2015

(54) METHOD FOR ENSURING A MINIMAL AMPLITUDE MODULATION IN PHASE-MODULATING LIGHT MODULATORS

(75) Inventor: Norbert Leister, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 875 days.

(21) Appl. No.: 12/525,451

(22) PCT Filed: Jan. 29, 2008

(86) PCT No.: PCT/EP2008/051001
§ 371 (c)(1),
(2), (4) Date: Nov. 24, 2009

(87) PCT Pub. No.: WO2008/092839
PCT Pub. Date: Aug. 7, 2008

(65) Prior Publication Data
US 2010/0118219 A1    May 13, 2010

(30) Foreign Application Priority Data

Jan. 31, 2007 (DE) .......................... 10 2007 005 821

(51) Int. Cl.
| | | |
|---|---|---|
| G02F 1/1335 | (2006.01) | |
| G02F 1/13363 | (2006.01) | |
| G02F 1/139 | (2006.01) | |
| G02F 1/13 | (2006.01) | |

(52) U.S. Cl.
CPC .......... *G02F 1/13363* (2013.01); *G02F 1/1313* (2013.01); *G02F 2203/12* (2013.01); *G02F 1/133634* (2013.01); *G02F 2413/10* (2013.01); *G02F 2001/133633* (2013.01); *G02F 1/1393* (2013.01)
USPC ............................................. 349/18; 349/117

(58) Field of Classification Search
USPC ..................................... 349/18, 117; 359/279
See application file for complete search history.

(56) References Cited

U.S. PATENT DOCUMENTS 5,240,636 A    8/1993   Doane et al.
5,777,706 A    7/1998   Chen et al.
(Continued)

FOREIGN PATENT DOCUMENTS

DE    43 39 395 A1    5/1994
DE    196 14 210 A1   10/1996
(Continued)

OTHER PUBLICATIONS

International Search Report, dated May 9, 2008, issued in priority International Application No. PCT/EP2008/051001 (in both German and English).
(Continued)

*Primary Examiner* — Jessica M Merlin
(74) *Attorney, Agent, or Firm* — Saul Ewing LLP (57) ABSTRACT

The invention relates to a phase-modulating light modulator and to a method for ensuring a minimal amplitude modulation in phase-modulating light modulators, wherein the phase-modulating light modulator comprises an optically active layer with at least one optically active volume region and with boundary surfaces, wherein the optically active layer is assigned at least one transparent compensation volume region which comprises at least one birefringent material with fixed refractive index ellipsoids, and has a polarizer arranged on the output side. An object is to achieve a reduced angle-dependence of the averaged amplitude modulation in the observation angle region. The object is achieved by optimizing the orientation with respect to one another of the refractive index ellipsoids of the optically active layer and of the compensation layers in a simulative manner.

4 Claims, 5 Drawing Sheets

(56) References Cited

U.S. PATENT DOCUMENTS

| | | | |
|---|---|---|---|
| 6,141,075 A | 10/2000 | Ohmuro et al. | |
| 6,867,834 B1* | 3/2005 | Coates et al. | 349/119 |
| 2003/0218709 A1 | 11/2003 | Ito et al. | |
| 2004/0155997 A1 | 8/2004 | West et al. | |
| 2005/0099575 A1* | 5/2005 | Liang | 349/153 |
| 2006/0203147 A1 | 9/2006 | Chen et al. | |
| 2006/0215093 A1 | 9/2006 | Nakao et al. | |
| 2008/0195348 A1 | 8/2008 | Shidemantle et al. | |

FOREIGN PATENT DOCUMENTS

| | | |
|---|---|---|
| DE | 103 43 561 A1 | 7/2004 |
| EP | 0 793 133 | 9/1997 |
| JP | 2006-113479 | 4/2006 |
| WO | WO 89/09807 | 10/1989 |

OTHER PUBLICATIONS

Chigrinov et al., "28.1: Invited Paper: LCD Optimization and Modeling," 2004 SID Intl. Symposium, SEattle, WA May 25-27, 2004, vol. XXXV, pp. 982-985 (May 25, 2004) XP007011887.

Kaminade et al., "Hybrid Aligned Rod-Like Liquid Crystalline Polymer Film as Viewing Angle Compensator for NW-TN-LCDS: Improvement of Gray Scale Performance," IEICE Transactions on Electornics, Electronics Society, Tokyo, JP, vol. E83-C, No. 10, pp. 1588-1592 (Oct. 1, 2000) XP000970179.

Jones et al., "TN-LCD Wide Viewing Angle Optimization," 19000101 (Jan. 1, 1900) XP007008735.

De Bougrenet de la Tocnaye et al.: Complex amplitude modulation by use of 5 liquid-crystal spatial light modulators, Appl. Optics 36, No. 8, 1997, pp. 1730.

Lueder, Ernst: Liquid crystal displays, Chichester (et al.): Wiley, 2001 (Repr. 2005) (Wiley-SiD series in display technology), ISBN: 0-471-49029-6.

Document Somalingam, S: "Verbesserung der Schaltdynamik nematischer Flüssigkristalle für adaptive optische Anwendungen", doctoral thesis, Darmstadt University of Technology, Mar. 2006.

Mori, H.: "The Wide View (WV) Film for Enhancing the Field of View of LCDs," Journal of Display Technology, vol. 1, No. 2 (2005).

* cited by examiner

METHOD FOR ENSURING A MINIMAL AMPLITUDE MODULATION IN PHASE-MODULATING LIGHT MODULATORS

CROSS REFERENCE TO RELATED APPLICATIONS

This application claims the priority of PCT/EP2008/051001, filed on Jan. 29, 2008, which claims priority to German Application No. 10 2007 005 821.9, filed Jan. 31, 2007, the entire contents of which are hereby incorporated in total by reference.

BACKGROUND OF THE INVENTION

The present invention relates to a phase-modulating light modulator and a method for ensuring minimum amplitude modulation in phase-modulating light modulators where the phase-modulating light modulator comprises an optically active layer with at least one optically active bulk region and with boundary surfaces on which means for the generation of a stationary orientation of the optically active layer are disposed, where the optically active layer comprises liquid crystals with pre-oriented refractive index ellipsoids whose orientation can be controlled discretely for each pixel with the help of the means for the generation of a stationary orientation of the liquid crystals, where the optically active layer is associated with at least one transparent compensation bulk region which comprises at least one birefringent material with fixed refractive index ellipsoids.

Spatial light modulators (SLM), e.g. as used in holographic applications, are optical elements which reflect or transmit in particular visible light and whose optical volume properties can be temporarily modified. The optical volume properties can be discretely modified for each pixel.

The optical volume properties can be temporarily modified e.g. by applying an electric field. The electric field can be controlled individually for small surface areas, which allows the optical properties to be controlled discretely for each pixel but fine enough for many holographic applications. Advantage is taken of this possibility for example in order to modify, i.e. to modulate, an incident wave front during its passage though the light modulator such that, from the observer's distance, it resembles a wave front which is emitted by a real object. If the light modulator is controlled accordingly, a holographic reconstruction of an object becomes possible without the need for this object to be actually present at the time of its observation.

The functional principle of a light modulator is based on an optically active layer whose optical volume properties depend on at least one externally controllable physical parameter and can be influenced specifically by varying that parameter. These physical parameters may be electric field strengths. However, other physical parameters, e.g. sound pressures have already been used successfully for a specific modification of the optical volume properties of optically active layers.

Transmissive light modulators typically have an entry polariser and an exit polariser, while reflective light modulators can be fitted with a combined entry and exit polariser.

The most common functional principle of a light modulator takes advantage of the layer made of birefringent material which is embedded between electrically controllable boundary surfaces, in particular between glass plates, in the form of liquid crystals (LC) whose orientation can be controlled, where the layer can be addressed discretely for each pixel in the form of volume units, which will be referred to as liquid crystal cells hereinafter. The control affects the refractive index ellipsoid of the liquid crystals in the individual liquid crystal cells. A change in the form or orientation of the refractive index ellipsoid in relation to the direction of the passing light varies both the optical path length of the light in the birefringent layer and its effect on the polarisation of the light which passes through it. The refractive index ellipsoid is thus a macroscopic model which describes the direction dependence of an effective refractive index which is exhibited by a certain volume of a birefringent substance in its interaction with light depending on the angle of incidence of the light. The position and form of the refractive index ellipsoid depends mainly on the orientation and the properties of the liquid crystals embedded in the considered volume. However, it is not necessarily identical to their orientation in individual cases. Nevertheless, the refractive index ellipsoid will be used hereinafter in order to characterise unambiguous conditions which depend on an orientation of the liquid crystals in birefringent volumes. When a wave front passes through a light modulator, it will be modified by way of a discrete amplitude modulation and/or phase modulation for each pixel. Because there are no light modulators which would be able to perform those two types of modulation in a fully independent manner in a certain transmission angle range, the light modulators are designed such that they are at least able to perform one type of modulation as efficiently as possible.

One problem in particular with phase-modulating light modulators is that disturbing side-effects may occur, which become manifest in various ways depending on the transmission angle of the light. One major side-effect is the angle dependence of the transmittance of the light modulator, which is hitherto insufficiently compensated when conventional light modulators are used. This leads to an undesired angle-dependent amplitude modulation of a phase-modulating light modulator.

Various types of light amplitude-modulating light modulators are known and widely used in two-dimensional (2D) display devices. They are therefore already designed to serve a large wavelength range and a large viewing angle range. The wavelength dependence of the transmittance is compensated by way of calibration at different wavelengths (red R, green G, blue B). In order to achieve a given transmittance at R, G or B, different voltages must be supplied to the liquid crystal cell for R, G and B.

If an observer looks at a light modulator at an oblique angle within the viewing angle range, there will be an angle dependence due to the fact that the observer only perceives light which passes through the liquid crystal layer under a different angle and which thus interacts with a different refractive index in the refractive index ellipsoid. The light therefore exhibits a different polarisation state at the exit polariser, and the light modulator exhibits a different, angle-dependent transmittance.

Documents EP 0793133 and U.S. Pat. No. 6,141,075 describe a liquid-crystal-based display device, where compensation films of birefringent uniaxial or biaxial material are disposed on boundary surfaces or glass plates of amplitude-modulating light modulators in order to compensate the angle dependence. The birefringent material is oriented such that its refractive index ellipsoid is complementary with that of the liquid crystal layer. Within a certain angular range, the light thus exhibits an effective refractive index which is independent of the viewing angle. The angle dependence of the refractive index of the liquid crystal layer and that of the compensation film substantially compensate each other.

One problem is that this is only possible for a certain angle of the liquid crystals, and thus only for a certain transmittance. A different transmittance is associated with a different liquid crystal angle, to which the compensation film is not adapted. In order to achieve a great contrast of the light modulator, the light modulator is compensated for a good black condition, i.e. for a condition with zero transmittance.

The angle dependence of an amplitude-modulating light modulator can thus be reduced at least partly by applying a compensation film or multiple compensation films for example onto one glass plate or onto both glass plates or by disposing it immediately next to the LC layer. The compensation film comprises a uniaxial or biaxial birefringent material. The refractive indices and the orientation are adapted to a certain condition of the amplitude-modulating light modulator. They are ideally designed such that the sum of the refractive indices of the liquid crystal and compensation film is always the same, irrespective of the angle of incidence of the light. If for example the refractive index ellipsoid of the liquid crystal has a longish, cigar-like shape, and if its semi-major axis is oriented at a right angle to the glass plates, the refractive index ellipsoid of the compensation film must be as flat as a pancake and oriented parallel to the glass plates, where the surface normal of the light modulator usually represents a symmetry axis or major axis of the refractive index ellipsoids of the compensation film.

An amplitude-modulating light modulator is typically optimised such that it exhibits great contrast in a large angular range. For this, the compensation film is adapted to the orientation of the liquid crystals which corresponds with the black condition. Great attention is therein paid to the fact that for compensation of the angle dependence of an amplitude-modulating light modulator the compensation film is adapted to a certain condition of the light modulator with a certain orientation of the liquid crystals.

One drawback of the above-mentioned method is that is not suitable for a wide range of rapidly changing transmittance values, because it always only allows one certain transmittance value to be compensated.

It is further known to compensate the wavelength dependence of phase-modulating light modulators by way of calibrating them at various wavelengths (R, G, B). However, this calibration does not take into account the angle dependence of the transmittance of a phase-modulating light modulator.

Document Somalingam, S: "Verbesserung der Schaltdynamik nematischer Flüssigkristalle für adaptive optische Anwendungen", doctoral thesis, Darmstadt University of Technology, March, 2006, describes phase-modulating light modulators in the form of liquid crystal cells. According to the initial orientation of the liquid crystals, the liquid crystal cells used are divided into Freedericksz cells, distorted alignment phase (DAP) cells and twisted nematic (TN) cells. They have in common the ability to modulate the phase of the incident light with the help of electric fields.

In Freedericksz cells, the liquid crystals exhibit a positive dielectric anisotropy, so that they are oriented parallel to the electrodes, which is why the maximum phase lag between the two polarisations is achieved in the no-field case.

In DAP cells, the liquid crystals exhibit a negative dielectric anisotropy, so that they are oriented perpendicular to the electrodes, which is why the maximum phase lag is achieved when the crystals have their maximum deflection.

In TN cells, the liquid crystals are arranged such to be twisted against each other, altogether by 90°, so that the polarisation of linear-polarised incident light is turned over the thickness of the cell. If a field is applied, the twisted arrangement of the liquid crystals will be broken, so that the polarisation twist cannot be maintained.

Figure 1:
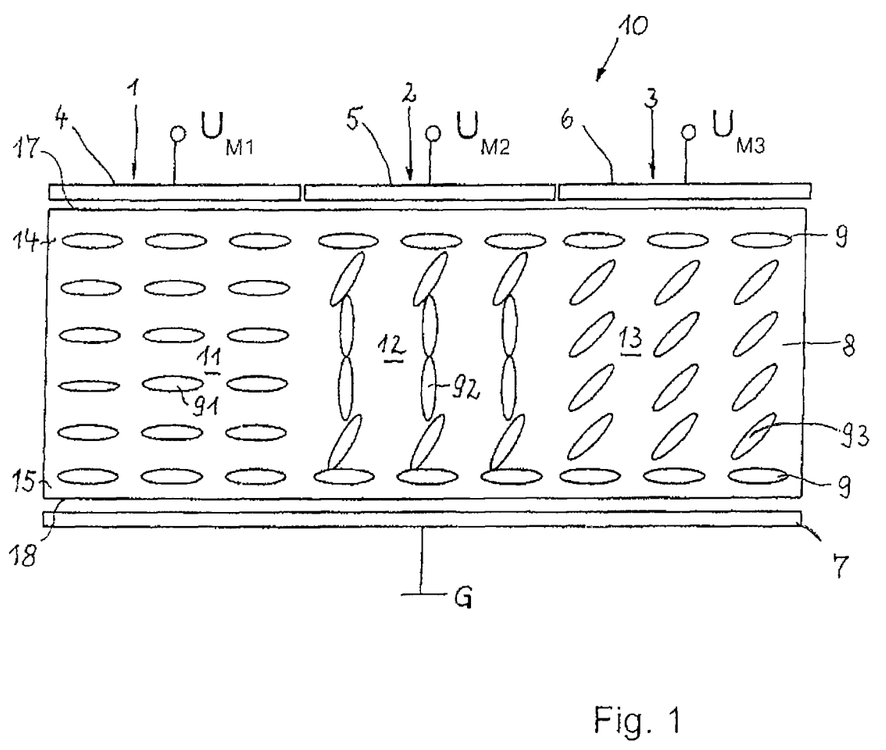
FIG. 1 is a schematic diagram showing a detail with three pixels of a prior art phase-modulating light modulator.

To illustrate this, FIG. 1 shows a schematic diagram of the phase-modulating light modulator 10 which is based on pixel-related Feedericksz cells, more specifically a detail comprising three pixels 1, 2, 3. The light modulator 10 comprises a birefringent layer 8, which comprises liquid crystals 9, and whose optical properties can be controlled by way of applying an electric field between the electrodes 4, 5, 6 and 7, where the electrodes 4, 5 and 6 are supplied with the modulation voltages $U_{M1}$, $U_{M2}$, and $U_{M3}$, and the electrode 7 is supplied with ground potential. The condition of the optical properties which is attained by way of controlling the electric field can be described with the help of refractive index ellipsoids, which are characterised by a ratio of axes and an orientation of their main axes—a major axis and two minor axes perpendicular to the former. The birefringent layer 8 is limited by parallel boundary surfaces 17, 18 on which the electrodes 4, 5, 6 and 7 can be disposed. The electrodes 4, 5, 6 and 7 are disposed at least in the immediate vicinity of the boundary surfaces 17, 18 of the birefringent layer 8, in order to be able to control the liquid crystals 9 discretely for each pixel at a selectivity which is as great as possible. According to FIG. 1, the electric field is controlled discretely for each pixel with the help of electrodes 4, 5 and 6, which are structured so to form pixels on the boundary surface 17 of the birefringent layer 8, by way of applying pixel-specific modulation voltages $U_{M1}$ to $U_{M3}$ against a common potential supplied to the electrode 7, which is disposed on the other boundary surface 18 of the birefringent layer 8. The common potential is shown as the common ground potential G. The modulation voltages $U_{M1}$ to $U_{M3}$ have different values, which in combination with the common ground potential G at the electrode 7 cause different electric field strengths. The different electric field strengths lead to a different orientation of the liquid crystals 9, namely the orientations 91, 92 and 93 of the liquid crystal molecules in the birefringent layer 8, which results in different positions of the refractive index ellipsoids in the individual bulk regions 11, 12 and 13 of the birefringent layer 8, said regions being exposed to different electric field strengths, and which can be illustrated by a different orientation in relation to the major axes of the refractive index ellipsoids.

Figures 2, 2A:
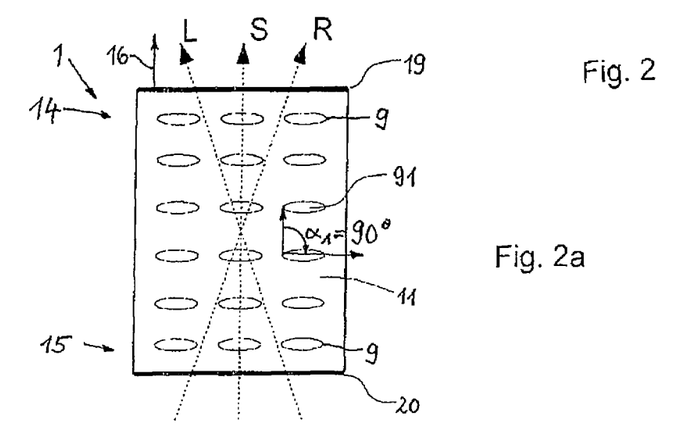
FIG. 2 is a schematic diagram showing different control states of the pixels according to FIG. 1, where
FIG. 2a shows a pixel without an electric field being applied, where the liquid crystals are pre-oriented parallel to the electrodes
Figure 2B:
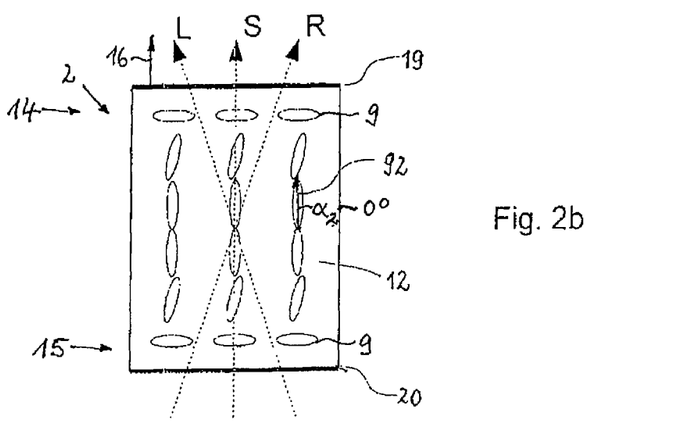
FIG. 2b shows a pixel with a maximum electric field being applied, where the liquid crystals are oriented almost perpendicularly to the electrodes
Figure 2C:
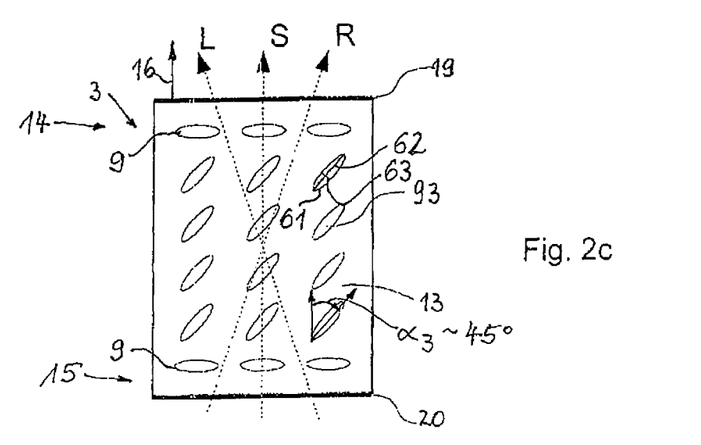
FIG. 2c shows a pixel with a medium electric field being applied, where the liquid crystals are oriented at an oblique angle to the electrodes according to the prior art.

FIGS. 2a, 2b and 2c show cross-sectional views of the pixels 1, 2 and 3 of the phase-modulating light modulator 10. To maintain a certain clarity, only the liquid crystals 9, 91, 92, 93 and the lower glass plate 19 and the upper glass plate 20 are shown.

The pixels 1, 2 and 3 comprise birefringent liquid crystals 9, 91, 92 and 93 without twist, i.e. without helical structure. Apart from the marginal regions 14, 15 next to the upper and lower glass plates 19 and 20, respectively, where the liquid crystals 9 are oriented in line with the glass plates 19, 20, the liquid crystals 91, 92 and 93 in the bulk regions 11, 12 and 13 are substantially oriented in parallel to each other. The term 'parallel orientation' shall be understood as an arrangement which homogenises the optical properties of the birefringent layer 8 at least in a way which leads to the effect that the optical properties of bulk regions 11, 12 and 13 with dimensions smaller than the pixel size can be described with the help of refractive index ellipsoids which have the same ratio of axes and which are oriented in parallel. To keep things simple, only the term 'orientation of the liquid crystals 9, 91, 92, 93' will be used below.

In order to achieve a phase modulation, an electric field changes the polar angle α between the liquid crystals 91, 92, 93 and the glass plate 19, 20 and thus the effective refractive index of the birefringent layer 8. As a consequence, the optical path length through the birefringent layer 8 is changed for the light of a certain polarisation which passes through the birefringent layer 8. This leads to the effect that the light which exits the differently controlled pixels 1, 2 and 3 can exhibit different phase conditions.

The orientations of the liquid crystals 9, 91, 92 and 93, and those of the refractive index ellipsoids at different electric fields between the electrodes (not shown), which are disposed above and below the layer 8, are indicated in FIGS. 2a to 2c. The liquid crystals 9, 91, 92 and 93 can be represented by the refractive index ellipsoids which are shown in the Figure. In the direction of the major axis 61 (z axis of the ellipsoid), the extraordinary refractive index $n_e$ applies, while in the perpendicular direction of the minor axes 62 (x, y axes of the ellipsoid) in a uniaxial liquid crystal, the ordinary refractive index $n_O$ applies. In a biaxial liquid crystal with two different minor axes, two values, $n_x$ and $n_y$, which are related to the two x, y axes 62, are used, instead of an ordinary refractive index $n_O$. In the case of a uniaxial liquid crystal with $n_e > n_O$, the refractive index ellipsoid has the same orientation as the liquid crystal 9, 91, 92, 93.

FIG. 2a shows the pixel 1 without an electric field being applied ($U_{M1} = G$). The liquid crystals 9, 91 are oriented at a polar angle $\alpha_1$ of 90° to the surface normal 16 of the glass plates 19, 20, i.e. parallel to the upper glass plate 19 and to the lower glass plate 20.

FIG. 2b shows pixel 2 with maximum electric field, where the liquid crystals 92 are oriented at a polar angle $\alpha_2$ of about 0°, with the exception of the marginal regions 14, 15, where boundary surface effects at the glass plates 19, 20 cause the liquid crystals 9 to be oriented substantially parallel to the glass plates 19, 20 irrespective of the electric field strength. However, the marginal regions 14, 15 with the liquid crystals 9 which are oriented in parallel along the glass plates 19, 20 are very thin, so that they can be neglected for the moment when discussing the optical properties of the light modulator 10.

FIG. 2c shows the pixel 3, which is exposed to a medium electric field, where the liquid crystals 93 are oriented at an oblique angle to the glass plates 19, 20, more specifically at a polar angle $\alpha_3$ of about 45°.

The arrows in FIGS. 2a to 2c illustrate the effect when an observer sees light which is transmitted through the light modulator 10 at an oblique angle. The arrow marked S represents light which is transmitted at a right angle, and the arrows marked L and R represent light which is transmitted at an oblique angle from the left-hand side and from the right-hand side, respectively. Because the light passes through the light modulator 10 at different angles, and thus with different orientations in relation to the refractive index ellipsoid, the light is subject to different delay and variations in the polarisation state.

If the light is transmitted at an oblique angle L, R, this usually has the effect that light which is linear-polarised after having passed an entry polariser when it enters the light modulator 10 is no longer linear-polarised when it exits the same. If an exit polariser is used, this non-linear polarisation state is expressed in an amplitude modulation, which is disturbing in the phase-modulating light modulator 10.

FIG. 2c shows the pixel 3, where a medium electric field is applied and where the liquid crystals 93 are oriented at an oblique angle. The variation in the polarisation state and thus the extent of amplitude modulation will be greatest in this pixel when the observer perceives the light which is transmitted in the transmission angle range or viewing angle range L-S-R. The relative orientation of the light in relation to the liquid crystals 93 is changed more drastically compared with the orientations of the liquid crystals 91, 92 shown in FIGS. 2a and 2b.

The orientation of the liquid crystals 91, 92 and 93 and that of the refractive index ellipsoids indicated in FIGS. 2a to 2c, are just examples of possible orientations in the phase-modulating light modulator 10.

The angle dependence of the amplitude modulation of a phase-modulating light modulator must be compensated in particular if the light sources used for illumination are displaced, or if multiple light sources are used at the same time. Displaceable light sources are required in a holographic display device for example if an observer window is to be tracked to a moving observer in the viewing angle range L-S-R. An observer window in this context is a virtual window in the observer plane, through which the observer sees the holographic reconstruction of an object. Under these circumstances, the light passes through the phase-modulating light modulator at different oblique angles, and the polarisation state of the light is only changed by changing the transmission angle in the viewing angle range L-S-R. If a polarisation filter is used to block undesired polarisation states, the change of the polarisation state will result in an additional amplitude modulation, which will in turn lead to a worse and angle-dependent reconstruction quality.

Compensation films and compensation bulk regions for amplitude-modulating light modulators in conjunction with optically active layers are described in the documents
1) De Bougrenet de la Tocnaye et al.: Complex amplitude modulation by use of liquid-crystal spatial light modulators, Appl. Optics 36, No. 8, 1997, pp. 1730,
2) Lueder, Ernst: Liquid crystal displays, Chichester (et al.): Wiley, 2001 (Repr. 2005) (Wiley-SiD series in display technology), ISBN: 0-471-49029-6,
3) US 2004/0155997 A1, and
4) DE 689 17 914 T2.

One problem is that the angle dependence of the transmittance or reflectance and thus of the amplitude modulation cannot be reduced substantially in phase-modulating light modulators in a large viewing angle range L-S-R by using the aforementioned compensation films and compensation bulk regions.

SUMMARY OF THE INVENTION

It is therefore the object of the present invention to provide a phase-modulating light modulator and a method for ensuring minimum amplitude modulation in phase-modulating light modulators, which are designed such that a reduced angle dependence of the transmittance or reflectance is achieved in the viewing angle range, where the angle dependence of the transmittance or reflectance represents a change in the polarisation state of the light which passes through the light modulator by changing the transmission angle in the given viewing angle range. If used for example in holographic display devices, the reconstruction quality shall thus be improved when reconstructing colour scenes at large viewing angles. This shall be ensured in particular where small observer windows are realised.

This object is solved by the features of claims 1 and 12.

The phase-modulating light modulator for holographic display devices comprises an optically active layer with at least one optically active bulk region and with boundary surfaces on which means for the generation of a stationary orientation of the optically active layer are disposed, where the optically active layer comprises liquid crystals with pre-oriented refractive index ellipsoids whose orientations can be controlled discretely for each pixel with the help of the means for the generation of a stationary orientation of the liquid crystals, where the optically active layer is associated with at least one transparent compensation bulk region which comprises at least one birefringent material with fixed refractive index ellipsoids, and
comprises a polariser which is disposed on the exit side, where according to the characterising clause of claim 1
the refractive index ellipsoids of the compensation bulk region are oriented in relation with the refractive index ellipsoids of the optically active layer depending on the orientation of the controllable refractive index ellipsoids of the optically active layer in the given viewing angle range L-S-R such that in the given viewing angle range L-S-R an averaged amplitude modulation exhibits a minimum.

The compensation bulk region can be represented by a transparent birefringent compensation film, which is disposed on one of the boundary surfaces and immediately next to the optically active layer, or next to one of the glass plates.

The compensation bulk regions can be represented by two transparent birefringent compensation films, which are disposed at either sides of the optically active layer, on their boundary surfaces.

The birefringent compensation films may comprise fixed liquid crystals. The two compensation films can have an orientation with a uniform compensation angle $\Theta_1$ of the fixed liquid crystals, where their compensation angle $\Theta_1$ is opposed to the polar angle $\alpha_3$ of the liquid crystals in the optically active layer.

Alternatively, the two compensation films can have crossing orientations, with a fixed negative compensation angle $\Theta_1$ and a fixed positive compensation angle $\Theta_2$ of the liquid crystals.

The optically active layer can also comprise fixed-orientation liquid crystals, and a transparent birefringent matrix with individual closed-space and pixel-related regions is embedded in said layer, those regions comprising controllable orientable liquid crystals, whose orientation can be controlled within these regions with the help of the means for the generation of a stationary state of the liquid crystals.

Usually, electrodes which are assigned to the pixels of the optically active layer are provided as means for the generation of a stationary state of the liquid crystals.

The phase-modulating light modulator can comprise Freedericksz cells and/or DAP cells and/or TN cells.

The fixed-orientation liquid crystals in the transparent compensation bulk region are arranged such that the averaged amplitude modulation of the light modulator exhibits a minimum if in a given viewing angle range L-S-R the averaging is performed over all orientations of the refractive index ellipsoids of the optically active layer which occur during a controlled phase modulation of the light modulator, and of the compensation bulk region.

Further, the fixed-orientation liquid crystals in the transparent compensation bulk region can be arranged such that the averaged amplitude modulation of the light modulator exhibits a minimum if in a given viewing angle range L-S-R the averaging is performed over all orientations of the refractive index ellipsoids of the optically active layer which occur during a controlled phase modulation of the light modulator, and of the compensation bulk region at a given weighting factor.

The method for ensuring a minimum amplitude modulation in phase-modulating light modulators, which comprise at least one transparent optically active bulk region whose refractive index ellipsoid can be controlled discretely for each pixel and at least one transparent optically active compensation bulk region which comprises at least one birefringent material with the fixed refractive index ellipsoids, where the transparent optically active bulk region and the transparent optically active compensation bulk region are arranged such that the light which is perceived by the observer passes both bulk regions, is provided to be used in the above-mentioned light modulators, where according to the characterising clause of claim 12 the orientation of the birefringent material with the fixed refractive index ellipsoids in the transparent compensation bulk region is chosen such that an averaged amplitude modulation of the light modulator in a viewing angle range L-S-R exhibits a minimum if in the given viewing angle range L-S-R the averaging is performed over all orientations of the refractive index ellipsoids of the optically active bulk region, including the transparent compensation bulk regions, which occur during a controlled phase modulation of the light modulator.

In detail, the method includes the following steps:
Definition of a viewing angle range L-S-R in which the averaged amplitude modulation shall exhibit a minimum,
Definition of a variation range in which a parameter $U_{M1}$, $U_{M2}$, $U_{M3}$, which is supplied to the light modulator from outside, and which affects the refractive index ellipsoid of the optically active layer, is varied during the modulation,
Definition of a first orientation of the birefringent material with fixed refractive index ellipsoids in the transparent compensation bulk region,
Calculation of an averaged amplitude modulation by way of numeric simulation of the transmittance or reflectance of the light modulator and finding the transmittance or reflectance variation range for a first orientation of the birefringent material with fixed refractive index ellipsoids in the transparent compensation bulk region by varying the viewing angle over the entire viewing angle range L-S-R and by varying the parameter $U_{M1}$, $U_{M2}$, $U_{M3}$, which is supplied to the light modulator from outside, over its entire variation range,
Definition of a further orientation of the birefringent material with fixed refractive index ellipsoids in the transparent compensation bulk region and repetition of the numeric simulation until an orientation of the birefringent material with fixed refractive index ellipsoids in the transparent compensation bulk region is found at which the averaged amplitude modulation of the transmittance or reflectance exhibits a minimum, and
Selection and definition of a compensation bulk region with an arrangement of the birefringent material in an orientation of the fixed refractive index ellipsoids at which the averaged amplitude modulation of the transmittance or reflectance exhibits a minimum.

The transmittance or reflectance of the light modulator as found in the numeric simulation can be weighted differently for the various viewing angles L, S, R when determining the minimum of the amplitude modulation.

The birefringent material with the fixed refractive index ellipsoids in the transparent compensation bulk region can be arranged at the orientation at which the averaged amplitude modulation of the transmittance or reflectance exhibits a minimum by using at least one birefringent transparent compensation film in which liquid crystals with the fixed refractive index ellipsoids are embedded at the respective orientation.

When finding the minimum of the averaged amplitude modulation, the viewing angle range L-S-R can be taken into consideration in the form of a transmission angle range for transmissive phase-modulating light modulators, and in the form of a reflection angle range for reflective phase-modulating light modulators.

The light modulator for holographic display devices can comprise at least one birefringent layer of liquid crystals, whose refractive index ellipsoid can be controlled discretely for each pixel by applying an electric field and comprises at least one compensation bulk region which is asymmetrical to the surface normal of the birefringent layer, where said compensation bulk region is opposed to at least one wavelength- and/or angle-dependent optical effect of the birefringent layer.

The invention opens up the possibility to provide a phase-modulating light modulator where at least one compensation film with fixed birefringent liquid crystals is disposed outside the birefringent layer. At least one compensation film with fixed birefringent liquid crystals can be disposed on either side of and outside the birefringent layer. In either case, the fixed birefringent liquid crystals in the compensation bulk regions are arranged such that, in each control state of the light modulator, the orientations of their refractive index ellipsoids can differ from the orientations of the refractive index ellipsoids of the orientable liquid crystals in the birefringent layer of the light modulator. Consequently, the surface normal of the birefringent layer of the light modulator does not form a symmetry axis of the refractive index ellipsoids of the liquid crystals in the birefringent layer. The angle dependence of the amplitude modulation of a phase-modulating light modulator is thus at least partially compensated if at least one birefringent compensation film, which comprises an uniaxial or biaxial birefringent material, is disposed on the light modulator. The uniaxial or biaxial birefringent material of this compensation film comprises is oriented and exhibits refractive indices such that an angle-dependent amplitude modulation of the light which is transmitted through or reflected from the light modulator is largely prevented in a large viewing angle range L-S-R of the light.

The present invention will be described in more detail below with the help of a number of embodiments and drawings, wherein:

DETAILED DESCRIPTION

Figure 3:
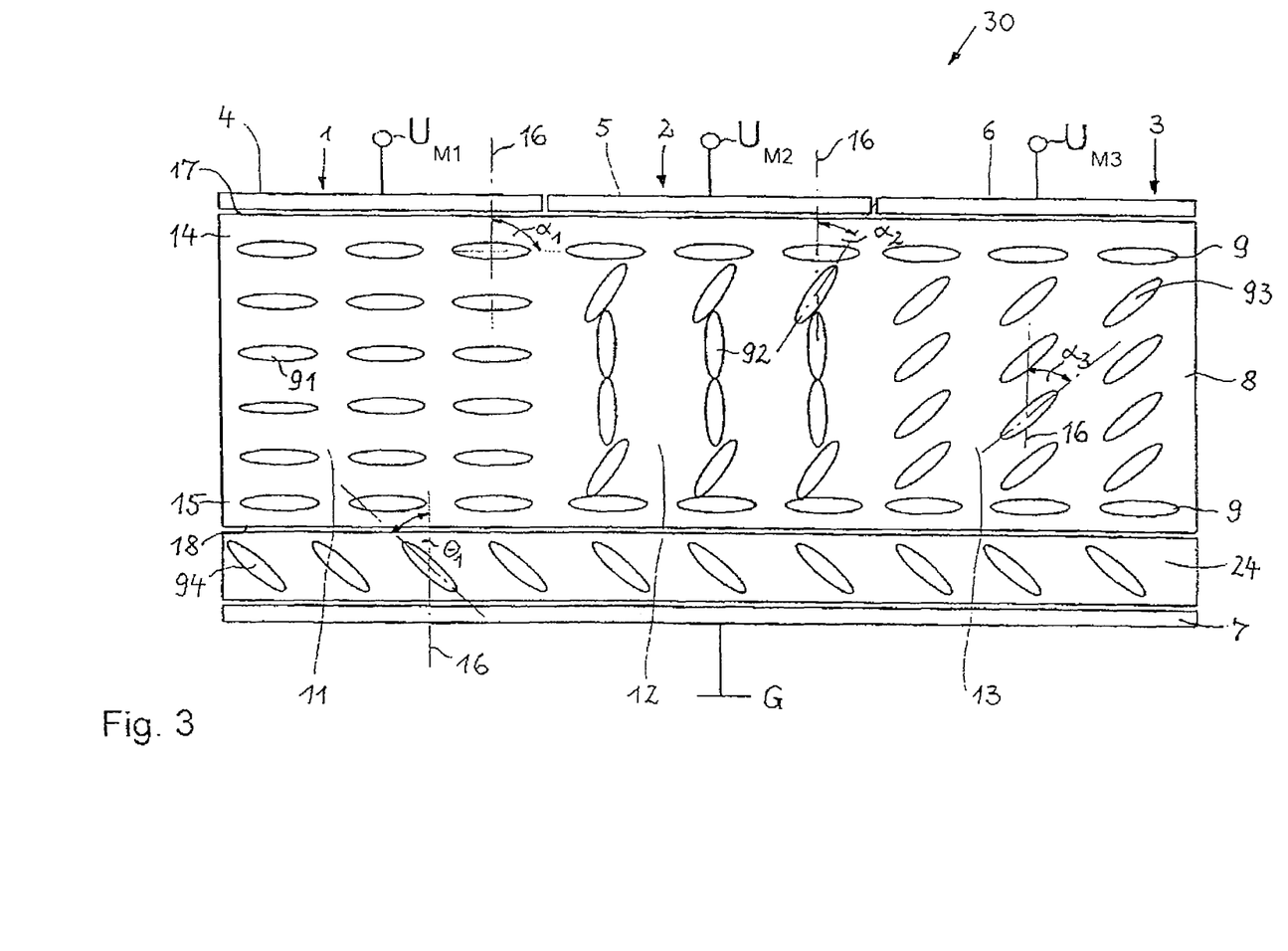
FIG. 3 is a schematic diagram showing a detail with three pixels of a phase-modulating light modulator which is fitted with a compensation film.

FIG. 3 is a schematic diagram showing a detail with three pixels 1, 2, 3 of a phase-modulating light modulator 30, with an optically active layer 8 which is largely identical to a prior art optical layer 8. The light modulator 30 thus comprises the birefringent layer 8, which comprises liquid crystals 9, 91, 92, 93, whose orientation can be controlled by way of applying an electric field between the electrodes 4, 5, 6 and 7, where the electrodes 4, 5 and 6 are supplied with the modulation voltages $U_{M1}$, $U_{M2}$, and $U_{M3}$, and where the electrode 7 is supplied with the ground potential G, and a polariser (not shown) on the exit side.

The condition of the optical properties which is achieved by way of controlling the electric field can be described with the help of refractive index ellipsoids 61, which are characterised by a ratio of axes and an orientation of their main axes—a major axis 62 and two minor axes 63, as shown in FIG. 2c. The birefringent layer 8 is limited by parallel boundary surfaces 17, 18 on which the electrodes 4, 5, 6 and 7 can be disposed. The electrodes 4, 5, 6 and 7 are disposed at least in the immediate vicinity of the boundary surfaces 17, 18 of the birefringent layer 8, in order to be able to rotate the liquid crystals 91, 92, 93 discretely for each pixel and at a selectivity which is as great as possible. According to FIG. 3, the electric field is controlled discretely for each pixel with the help of electrodes 4, 5 and 6, which are structured so to form pixels on the boundary surface 17 of the birefringent layer 8, by way of applying modulation voltages $U_{M1}$ to $U_{M3}$ discretely for each pixel against a common potential supplied to the electrode 7, which is disposed on the other boundary surface 18 of the birefringent layer 8. The common potential is shown as the common ground potential G. The modulation voltages U.sub.M1 to U.sub.M3 have different values, which in combination with the common ground potential G at the electrode 7 cause different electric field strengths. The different electric field strengths lead to a different orientation of the liquid crystals 91, 92, 93 in the birefringent layer 8, which results in the optical properties in the individual bulk regions 11, 12 and 13 of the birefringent layer 8 to be controlled differently, as said bulk regions are exposed to different electric field strengths, and which can be illustrated by a different orientation of the main axes, in particular of the major axes 61 of the refractive index ellipsoids.

As shown in FIG. 3, in order to achieve a phase modulation, an electric field changes the polar angle $\alpha_1$, $\alpha_2$, $\alpha_3$ between the liquid crystals 91, 92, 93 and the glass plates 19, 20 and thus the effective refractive index of the birefringent layer 8. As a consequence, the optical path length through the birefringent layer 8 is changed for the light which passes through the birefringent layer 8. This will lead to the effect that the light which exits the differently controlled pixels 1, 2, 3 can exhibit different phase conditions.

Referring to FIG. 3, a compensation film 24 is disposed between the boundary surface 18 and the electrode 7, which carries ground potential G. The orientation of the fixed liquid crystals 94 of the compensation film 24 crosses the orientation of the liquid crystals 9, 91, 92, 93 under a negative compensation angle $\Theta_1$ related to the surface normal 16 of the boundary surfaces 17, 18.

According to the invention, the refractive index ellipsoids 94 of the compensation bulk region 24 are oriented in relation with the refractive index ellipsoids 9, 91, 92, 93 of the optically active layer 8 depending on the orientation of the controllable refractive index ellipsoids 9, 91, 92, 93 of the optically active layer 8 in the given viewing angle range L-S-R, as shown in FIG. 2, of the transmitted or reflected light such that in the given viewing angle range L-S-R an averaged amplitude modulation exhibits a minimum.

Thanks to the method for ensuring minimum amplitude modulation in amplitude-modulating light modulators, the amplitude modulation is kept as low as possible over all orientations of the liquid crystals 9, 91, 92, 93. This is why all orientations of the liquid crystals 9, 91, 92, 93, 94 will be considered in the averaging process.

Figures 4, 4A:
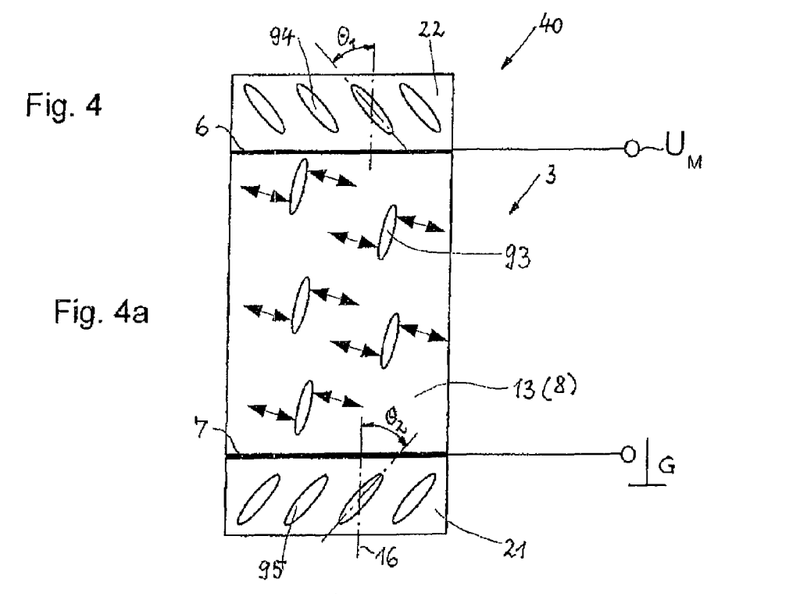
FIG. 4 is a schematic diagram showing a phase-modulating pixel of a light modulator which is fitted with compensation films on its boundary surfaces, where
FIG. 4a illustrates the case where the two compensation films have refractive index ellipsoids whose major axes are crossed.

An averaged amplitude modulation of the phase-modulating light modulator 30 is thus minimised according to this invention. The averaging in a given viewing angle range L-S-R is performed over all orientations of the liquid crystals 9, 91, 92, 93, 94, which are required by the light modulator 30 for phase modulation. The minimisation of the amplitude modulation is achieved by adapting to each other the orientations of the refractive index ellipsoids and thus their refractive indices in a birefringent compensation film 24, as shown in FIG. 3, or in multiple birefringent compensation films 21, 22, as shown in FIG. 4a, or 221, 222, as shown in FIG. 4b This can be done for example in a control unit (not shown) with the help of software means which contain parameters about the orientation of the liquid crystals 9, 91, 92, 93, 94, where the control unit and the electrodes 4, 5, 6 and 7 are connected by signal and power lines.

It is also possible in the averaging process to weight differently the angles L, S, R of the transmitted or reflected light or the orientations of the liquid crystals 9, 91, 92, 93. For example, a central region in the bulk regions 11, 12, 13 can be given greater weight so to achieve a particular low remaining amplitude modulation in that region.

The major difference to the orientation control for an amplitude-modulating light modulator is that in the phase-modulating light modulator 30 an orientation control is performed over all required liquid crystal orientations. This generally leads to the effect that the refractive index ellipsoids of the birefringent compensation films 24, 21, 22, 221 and 222 are not oriented parallel or perpendicular to the glass plates 19, 20 of the light modulators 30, 40, 50, 60, so that the surface normal 16 of the light modulators 30, 40, 50, 60 does not form a symmetry axis. Such birefringent compensation films 24, 21, 22, 221 and 222 are asymmetrical compensation elements, which, however, in the interplay with the asymmetry of the actual controllable birefringent layer 8 exhibit a good compensation effect in medium control states, because the asymmetries are at least partly compensated in these medium control states of the liquid crystals 93 with positive angle by a corresponding design of the compensation films 24, 21, 22, 221 and 222 with negative angle, or vice versa.

Figure 4B:
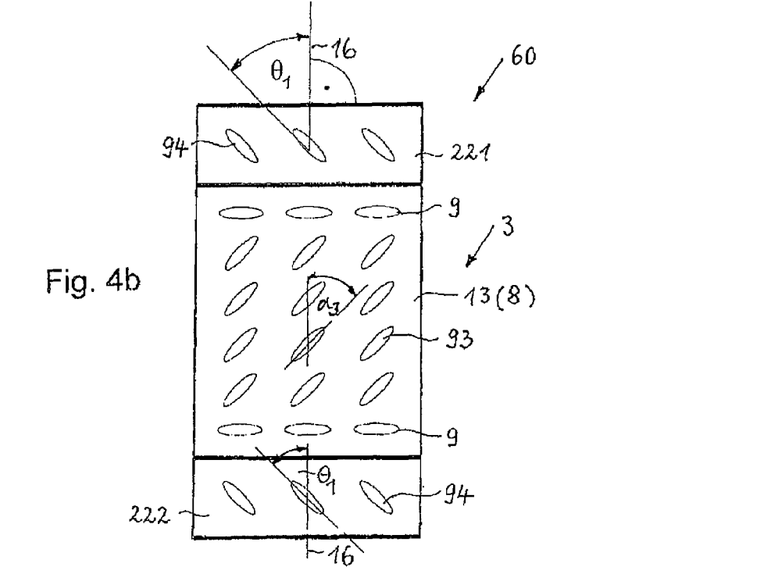
FIG. 4b illustrates the case where the two compensation films have refractive index ellipsoids whose major axes are parallel.

One result of such averaged and minimised amplitude modulation is shown for the pixel 3 in FIGS. 3 and 4b. The refractive index ellipsoid of the compensation films 24 and 221 has a negative compensation angle $\theta_1$ to the surface normal 16, and the compensation film 222 has a negative compensation angle $\theta_2$ to the surface normal of the glass plates 19, 20 and is about perpendicular to a mean polar angle $\alpha_3$ of the liquid crystals 93 in the medium electric field. A compensation is possible either with only one compensation film 24, disposed on the upper glass plate 19 or on the lower glass plate 20, as shown in FIG. 3, or with two compensation films 221, 222, disposed on the upper glass plate 19 and on the lower glass plate 20, as shown in FIG. 4b.

Referring to FIG. 4a, compensation films 21 and 22 are disposed on the electrodes 6 and 7, respectively, of the light modulator 40, where the fixed liquid crystals 94, 95 in these films differ in their compensation angles $\theta_1$ (negative) and $\theta_2$ (positive), so that the corresponding orientations, or corresponding major axes, in the compensation films 21 and 22 intersect.

Figure 5:
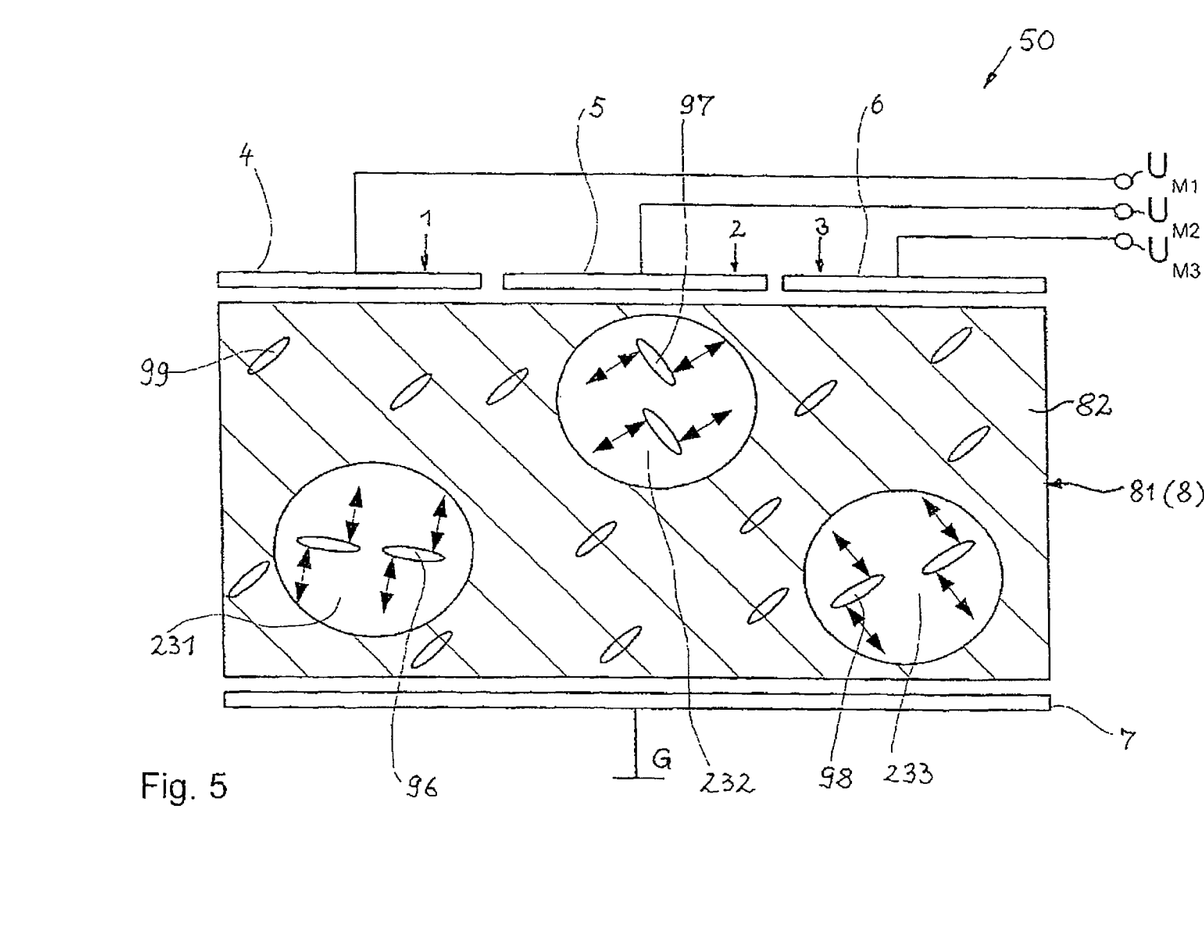
FIG. 5 is a schematic diagram showing a light modulator with regions which are embedded in the optically active layer, which serves as compensation layer, said regions comprising liquid crystals whose orientation can be controlled.

FIG. 5 shows a detail of another light modulator 50 according to this invention. In that case the birefringent layer 81, which can be controlled discretely for each pixel, comprises a transparent compensation matrix 82, preferably made of a polymeric material with fixed liquid crystals 99, where confined regions 231, 232, 233, which comprise birefringent liquid crystals 96, 97, 98 in a substantially mobile manner, are situated in that matrix. Outside of those confined regions 231, 232, 233, birefringent materials 99 are fixedly embedded in the transparent layer 81 and are oriented in at least one direction. The mobile birefringent liquid crystals 96, 97, 98 are always included such that if an electric field is applied the liquid crystals 96, 97, 98 can turn in a certain angular range, which is required for a modulation effect as desired by the phase-modulating light modulator 50. The non-controllable, immobile birefringent materials 99 are embedded in the transparent compensation matrix 82 such that the direction in which the birefringent materials 99 are oriented differs from the possible directions in which the mobile birefringent liquid crystals 96, 97, 98 can be oriented.

This way the transparent compensation matrix 82 with the fixedly embedded birefringent materials 99 can have a compensation effect which is identical to or at least similar to that of the compensation films 24, 21, 22, 221, 222 described above. If configured with view to an averaged amplitude modulation with minimal variation range including the confined regions 231, 232, 233 for the definition and embedding of the mobile birefringent liquid crystals 96, 97, 98, the light modulator 50 can be controlled such that the electrode structure outside the birefringent compensation matrix 82 is supported and the light modulator 50 exhibits great selectivity.

The regions 231, 232, 233, which are fixedly embedded in the birefringent layer 8, 81, can be volumes with pre-oriented liquid crystals of the same type as contained in Freedericksz cells, DAP cells and/or TN cells.

The orientation control of the liquid crystals for an extensive compensation of the wavelength dependence and angle dependence will be described in the embodiments with the example of the phase-modulating light modulators 30, 40, 50, 60. The invention can also be applied analogously to phase-modulating light modulators of a reflective type.

The method according to the present invention is used for orientation control of the phase-modulating light modulators 30, 40, 50, 60. According to a special embodiment, the light modulators 30, 40, 50 or 60 can be designed in the form of Freedericksz cells, i.e. the liquid crystals are not twisted and are oriented at right angles to the glass plates 19, 20. The light is thus subject to a mere phase modulation, i.e. without any change of the polarisation state and without any amplitude modulation, if the light is transmitted through the light modulator 30, 40, 50 or 60, and thus the polariser (not shown) disposed on the entry side, at a right angle and with a linear polarisation parallel to the liquid crystals 91, 92, 93.

In Freedericksz cells, a polar angle $\alpha$ of 20° and a random azimuth angle are used for orientation control with minimum amplitude modulation for the observer and thus for the light which is transmitted through the light modulator 30, 40, 50 or 60. A polar angle α of 20° means that the light has an angle of 20° to the surface normal 16 of the glass plates 19, 20. The liquid crystals 91, 92, 93 have an azimuth angle of 0° and a polar angle α which varies according to the strength of the applied electric field in a range of between 0° and 90°. The liquid crystal layer 8 has a thickness of 4.3 μm.

Referring to FIG. 4b, the light modulator 60 is, for example, fitted with the compensation film 221 on the upper glass plate 19 and with the compensation film 222 on the lower glass plate 20. Each of the compensation films 221, 222 is about 2.15 μm thick and comprises a birefringent material with the parameters of the liquid crystal, i.e. $n_e=1.6727$ and $n_o=1.501$. The preferred orientation was found at a polar angle $\alpha_3$ of 20° and an azimuth angle of 180°. In the cross-section of the light modulator 60, as shown in FIG. 4b, this corresponds with a negative compensation angle $\theta_1=20°$.

The effect of such orientation-related, selectable and adapted compensation films 24, 21, 22, 221, 222 according to the present invention becomes clear in comparison with an uncompensated light modulator and with a light modulator which is compensated in analogy with an amplitude-modulating light modulator.

At an exemplary azimuth angle of 60°, the following disturbing amplitude modulation will remain if the liquid crystals 9, 91, 92, 93; 96, 97, 98 are turned to a maximal polar angle of 90° by applying an electric field:

Without compensation: amplitude modulation about 25%
Compensation as in an amplitude-modulating light modulator: amplitude modulation about 15%
Compensation according to this invention: amplitude modulation about 4%

The method for ensuring a minimum amplitude modulation in phase-modulating light modulators, which comprise at least one transparent optically active bulk region 11, 12, 13, 231, 232, 233 whose refractive index ellipsoid can be controlled discretely for each pixel, and at least one transparent optically active compensation bulk region 24, 21, 22, 221, 222, 82 which comprises at least one birefringent material with the fixed refractive index ellipsoids 94, 95, 99, where the transparent optically active bulk region 11, 12, 13, 231, 232, 233 and the transparent optically active compensation bulk region 24, 21, 22, 221, 222, 82 are arranged such that light which is transmitted through the light modulator 30, 40, 50, 60 passes both bulk regions 11, 12, 13, 231, 232, 233; 24, 21, 22, 221, 222, 82, is provided to be used mainly for selecting and defining the compensation bulk regions 24, 21, 22, 221, 222, 82 in the light modulators 30, 40, 50, 60.

According to the present invention, the orientation of the birefringent material with the fixed refractive index ellipsoids 94, 95, 99 in the transparent compensation bulk region 24, 21, 22, 221, 222, 82, is chosen such that an averaged amplitude modulation of the light modulator 30, 40, 50, 60 exhibits a minimum if the averaging in a given viewing angle range L-S-R is performed over all orientations of the refractive index ellipsoids of the optically active bulk region 11, 12, 13, 231, 232, 233 including the transparent compensation bulk regions 24, 21, 22, 221, 222, 82 which occur during a controlled modulation of the light modulator 30, 40, 50, 60.

The method includes the following steps:

Definition of a viewing angle range L-S-R in which the amplitude modulation is minimised, Definition of a variation range in which a parameter, the voltages $U_{M1}, U_{M2}, U_{M3}$, which are supplied to the light modulator 30, 40, 50, 60 from outside, and which affect the refractive index ellipsoid of the optically active layer 8, 81, is varied during the modulation, Definition of a first orientation of the birefringent material with fixed refractive index ellipsoids 94, 95, 99 in the transparent compensation bulk region 24, 21, 22, 221, 222, 82, Calculation of an averaged amplitude modulation by way of numeric simulation of the transmittance of the light modulator 30, 40, 50, 60 and finding the transmittance variation range for a first orientation of the birefringent material with fixed refractive index ellipsoids 94, 95, 99 in the transparent compensation bulk region 24, 21, 22, 221, 222, 82 by varying the transmission angle over the entire viewing angle range L-S-R and by varying the parameter $U_{M1}, U_{M2}, U_{M3}$, which is supplied to the light modulator 30, 40, 50, 60 from outside, over its entire variation range, Definition of a further orientation of the birefringent material with fixed refractive index ellipsoids 94, 95, 99 in the transparent compensation bulk region 24, 21, 22, 221, 222, 82 and repetition of the numeric simulation until an orientation of the birefringent material with fixed refractive index ellipsoids 94, 95, 99 in the transparent compensation bulk region 24, 21, 22, 221, 222, 82 is found at which the averaged amplitude modulation of the transmittance exhibits a minimum, and Selection and definition of the transparent compensation bulk region 24, 21, 22, 221, 222, 82 with an arrangement of the birefringent material with fixed refractive index ellipsoids 94, 95, 99 in the transparent compensation bulk region 24, 21, 22, 221, 222, 82 with an orientation of the fixed refractive index ellipsoids 94, 95, 99 at which the averaged amplitude modulation of the transmittance exhibits a minimum.

The transmittance of the light modulator 30, 40, 50, 60 as found in the numeric simulation can be weighted differently for different viewing angles or viewing directions L, S, R when determining the minimum of the amplitude modulation.

The birefringent material with the fixed refractive index ellipsoids 94, 95, 99 in the transparent compensation bulk region 24, 21, 22, 221, 222, 82 can be arranged at the orientation at which the averaged amplitude modulation of the transmittance exhibits a minimum by using at least one birefringent transparent compensation film in which birefringent liquid crystals with the fixed refractive index ellipsoids 94, 95, 99 are embedded at the respective orientation.

When finding the minimum of the averaged amplitude modulation, the viewing angle range L-S-R can be taken into consideration in the form of a transmission angle range for transmissive phase-modulating light modulators, and in the form of a reflection angle range for reflective phase-modulating light modulators.

LIST OF REFERENCE NUMERALS

1 First pixel
2 Second pixel
3 Third pixel
4 First electrode
5 Second electrode
6 Third electrode
7 Ground potential electrode
8 Layer
81 Layer
82 Compensation matrix
9 Liquid crystal
91 Liquid crystal
92 Liquid crystal 93 Liquid crystal
94 Liquid crystal
95 Liquid crystal
96 Liquid crystal
97 Liquid crystal
98 Liquid crystal
99 Liquid crystal
10 First light modulator
11 First bulk region
12 Second bulk region
13 Third bulk region
14 First marginal region
15 Second marginal region
16 Surface normal
17 First boundary surface
18 Second boundary surface
19 First glass plate
20 Second glass plate
21 First compensation film
22 Second compensation film
221 Compensation film
222 Compensation film
231 First region
232 Second region
233 Third region
24 Third compensation film
30 Third light modulator
40 Fourth light modulator
50 Fifth light modulator
60 Sixth light modulator
61 Refractive index ellipsoid
62 Major axis
63 Minor axes
$U_{M1}$ First modulation voltage
$U_{M2}$ Second modulation voltage
$U_{M3}$ Third modulation voltage
G Ground potential
S Light directed at the light modulator under a right angle
R Light directed at the light modulator under an oblique angle from the right
L Light directed at the light modulator under an oblique angle from the left
$\theta_1, \theta_2$ Compensation angles
$\alpha_1, \alpha_2, \alpha_3$ Polar angles
L-S-R Viewing angle range

The invention claimed is:

1. A method for ensuring a minimum amplitude modulation in phase-modulating light modulators, which comprise at least one transparent optically active bulk region whose refractive index ellipsoid can be controlled discretely for each pixel and at least one transparent optically active compensation bulk region which comprises at least one birefringent material with fixed refractive index ellipsoids, where the transparent optically active bulk region and the transparent optically active compensation bulk region are arranged such that the light which is perceived by the observer passes both bulk regions, to be used in a light modulator comprising an optically active layer with at least one optically active bulk region and with boundary surfaces on which means for the generation of a stationary orientation of the optically active layer are disposed, where the optically active layer comprises liquid crystals with pre-oriented refractive index ellipsoids whose orientations can be controlled discretely for each pixel with the help of the means for the generation of a stationary orientation of the liquid crystals, where the optically active layer is associated with at least one transparent compensation bulk region which comprises at least one birefringent material with fixed refractive index ellipsoids, and comprising a polariser on its exit side, wherein an orientation of the fixed refractive index ellipsoids of the compensation bulk region is dependent on the possible orientation range of the refractive index ellipsoids of the optically active layer and the given viewing angle range, wherein the orientation of the birefringent material with the fixed refractive index ellipsoids in the transparent compensation bulk region is determined by a procedure comprising the following steps:

defining a viewing angle range in which an averaged amplitude modulation is provided for showing a minimum, defining a variation range in which a parameter, which are supplied to the light modulator from outside, and which affects the refractive index ellipsoid of the optically active layer, is varied during the modulation, defining a first orientation of the birefringent material with fixed refractive index ellipsoids in the transparent compensation bulk region, calculating an averaged amplitude modulation by way of numeric simulation of the transmittance or reflectance of the light modulator and finding the transmittance or reflectance variation range for the first orientation of the birefringent material with fixed refractive index ellipsoids in the transparent compensation bulk region by varying the viewing angle over the entire viewing angle range and by varying the parameter, which is supplied to the light modulator from outside, over its entire variation range, defining a further orientation of the birefringent material with fixed refractive index ellipsoids in the transparent compensation bulk region and repetition of the numeric simulation until all averaged amplitude modulations for all possible orientations of the birefringent material with fixed refractive index ellipsoids in the transparent compensation bulk region are found, and selecting the orientation of the refractive index ellipsoids of the birefringent material in the compensation bulk region at which the averaged amplitude modulation of the transmittance or reflectance and thus the averaged amplitude modulation shows a minimum;

fixing the selected orientation of the refractive index ellipsoids of the birefringent material in the compensation bulk region for which the averaged amplitude modulation shows a minimum.

2. The method for ensuring a minimum amplitude modulation in phase-modulating light modulators according to claim 1, wherein the averaged amplitude modulation of the light modulator as found in the numeric simulation is weighted differently for different viewing angles when determining the minimum of the amplitude modulation.

3. The method for ensuring a minimum amplitude modulation in phase-modulating light modulators according to claim 2, wherein the birefringent material with the fixed refractive index ellipsoids in the transparent compensation bulk region is arranged at the orientation at which the averaged amplitude modulation exhibits a minimum by using at least one birefringent transparent compensation film in which liquid crystals with the fixed refractive index ellipsoids are embedded at the respective orientation.

4. The method for ensuring a minimum amplitude modulation in phase-modulating light modulators according to claim 1, wherein when finding the minimum of the averaged amplitude modulation, the viewing angle range is taken into consideration in the form of a transmission angle range for transmissive phase-modulating light modulators, and in the form of a reflection angle range for reflective phase-modulating light modulators.

* * * * *